United States Patent
Aso et al.

(10) Patent No.: US 11,268,702 B2
(45) Date of Patent: *Mar. 8, 2022

(54) HEATING POWER CONTROL SYSTEM AND RECORDING MEDIUM

(71) Applicant: PANASONIC INTELLECTUAL PROPERTY CORPORATION OF AMERICA, Torrance, CA (US)

(72) Inventors: Mitsuhiro Aso, Osaka (JP); Masao Nonaka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/012,979

(22) Filed: Sep. 4, 2020

(65) Prior Publication Data
US 2020/0400316 A1    Dec. 24, 2020

Related U.S. Application Data

(63) Continuation of application No. 16/371,341, filed on Apr. 1, 2019, now Pat. No. 10,801,733, which is a
(Continued)

(30) Foreign Application Priority Data

Jul. 11, 2014   (JP) .................. 2014-143118

(51) Int. Cl.
*F24C 7/08*   (2006.01)
*H05B 1/02*   (2006.01)
(Continued)

(52) U.S. Cl.
CPC ............. *F24C 7/082* (2013.01); *G05B 15/02* (2013.01); *H05B 1/0261* (2013.01); *H05B 6/6441* (2013.01); *H05B 6/668* (2013.01)

(58) Field of Classification Search
CPC ...... H05B 1/0261; G05B 15/02; G05D 23/00; F24C 7/082
See application file for complete search history.

(56) References Cited

U.S. PATENT DOCUMENTS

| 4,775,913 A | 10/1988 | Ekblad |
| 5,360,965 A | 11/1994 | Ishii |

(Continued)

FOREIGN PATENT DOCUMENTS

| JP | 5-256445 | 10/1993 |
| JP | 2005-235627 | 9/2005 |

(Continued)

*Primary Examiner* — Mark A Connolly
(74) *Attorney, Agent, or Firm* — Greenblum & Bernstein, P.L.C.

(57) ABSTRACT

A heating power control system includes a storage that stores cooking information including a cooking process that is executed using a cooking appliance and is obtained from a server device, a receiver that receives detection information indicating an absence or a presence of a user of the cooking appliance, and a controller that determines whether or not the user is absent for a predetermined period of time based on the detection information, determines, based on the cooking information, whether or not the cooking process is a heating process when the user is determined to be absent for the predetermined period of time, determines, based on the cooking information, a control method of controlling heating power of the cooking appliance when the cooking process is determined to be a heating process, and controls the heating power of the cooking appliance by the control method.

17 Claims, 5 Drawing Sheets

Related U.S. Application Data continuation of application No. 15/711,376, filed on Sep. 21, 2017, now Pat. No. 10,281,155, which is a continuation of application No. 14/791,278, filed on Jul. 3, 2015, now Pat. No. 9,803,871.

(51) Int. Cl.
 *G05B 15/02* (2006.01)
 *H05B 6/64* (2006.01)
 *H05B 6/66* (2006.01)

(56) References Cited

U.S. PATENT DOCUMENTS

| | | | |
|---|---|---|---|
| 5,945,017 A | 8/1999 | Cheng | |
| 6,253,761 B1 | 7/2001 | Shuler | |
| 8,555,776 B2 | 10/2013 | Murphy | |
| 9,803,871 B2 | 10/2017 | Aso | |
| 10,801,733 B2 * | 10/2020 | Aso | H05B 1/0261 |
| 2003/0010776 A1 | 1/2003 | Kang | |
| 2003/0075538 A1 * | 4/2003 | Kish | H05B 6/6441 219/506 |
| 2007/0175888 A1 | 8/2007 | Wash | |
| 2012/0171343 A1 | 7/2012 | Cadima | |
| 2013/0260320 A1 | 10/2013 | Townsend | |
| 2015/0064314 A1 | 3/2015 | Manuel | |
| 2018/0151176 A1 * | 5/2018 | Qian | G06F 3/017 |
| 2018/0251176 A1 | 9/2018 | Ogawa | |

FOREIGN PATENT DOCUMENTS

| | | |
|---|---|---|
| JP | 2006-029710 | 2/2006 |
| JP | 2010-014372 | 1/2010 |
| JP | 2012-119166 | 6/2012 |

* cited by examiner

FIG. 2

| RECIPE NAME | COOKING CONDITION | FIRST COOKING STEP | SECOND COOKING STEP | THIRD COOKING STEP |
|---|---|---|---|---|
| CURRY | COOKING METHOD | CUTTING | STIR-FRYING | BOILING |
| | REQUIRED PERIOD OF TIME | 5 MINUTES | 2 MINUTES | 15 MINUTES |
| | HEATING POWER | – | HIGH HEAT | MEDIUM HEAT |

FIG. 3

| HEATING METHOD | CONTROL METHOD |
|---|---|
| BOILING/ STEAMING | LOW HEAT |
| STIR-FRYING/ GRILLING | TURNING DOWN HEAT TO LOW HEAT AND THEN TURNING OFF HEAT AFTER ELAPSE OF CERTAIN PERIOD OF TIME |
| FRYING | TURNING OFF HEAT |

HEATING POWER CONTROL SYSTEM AND RECORDING MEDIUM

This application is a continuation application of U.S. application Ser. No. 16/371,341, filed Apr. 1, 2019, which is a continuation application of U.S. application Ser. No. 15/711,376, filed Sep. 21, 2017, now U.S. Pat. No. 10,281,155, issued May 7, 2019, which is a continuation application of U.S. application Ser. No. 14/791,278, filed Jul. 3, 2015, now U.S. Pat. No. 9,803,871, issued Oct. 31, 2017, which claims the benefit of Japanese Appl. No. 2014-143118, filed Jul. 11, 2014. The disclosure of each of the above-mentioned documents, including the specification, drawings, and claims, is incorporated by reference herein in its entirety.

BACKGROUND

1. Technical Field

The present disclosure relates to a heating power control device and a heating power control method for controlling heating power of a cooking appliance, and the present disclosure relates to a recording medium storing a computer program for controlling heating power of a cooking appliance.

2. Description of the Related Art

For example, Japanese Unexamined Patent Application Publication No. 2010-14372 proposes a technique for turning off the heat of a cooking appliance in a case where a user (a person who cooks) leaves a kitchen during cooking involving heating and does not return to the kitchen within a predetermined period of time.

However, the technique of Japanese Unexamined Patent Application Publication No. 2010-14372 still needs further improvements.

SUMMARY

In one general aspect, the techniques disclosed here feature a terminal includes a storage in which control method information is stored, the control method information indicating a relationship between each of a plurality of heating methods of an ingredient and each of a plurality of corresponding control methods for reducing heating power of a cooking appliance; and a controller that, in a case where the absence of a user of the cooking appliance from a kitchen is detected for a predetermined period of time during execution of one of the plurality of heating methods, determines a first control method corresponding to the one of the plurality of heating methods based on the control method information stored in the storage and then causes the cooking appliance to execute the first control method. The first control method is a method for reducing the heating power used in the one of the plurality of heating methods.

According to the present disclosure, in a case where a user leaves a kitchen, heating power can be adjusted in accordance with a heating method that is being executed.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a diagram illustrating an example of recipe information according to the embodiment of the present disclosure;

FIG. 3 is a diagram illustrating an example of control method information according to the embodiment of the present disclosure;

DETAILED DESCRIPTION

Figure 1:
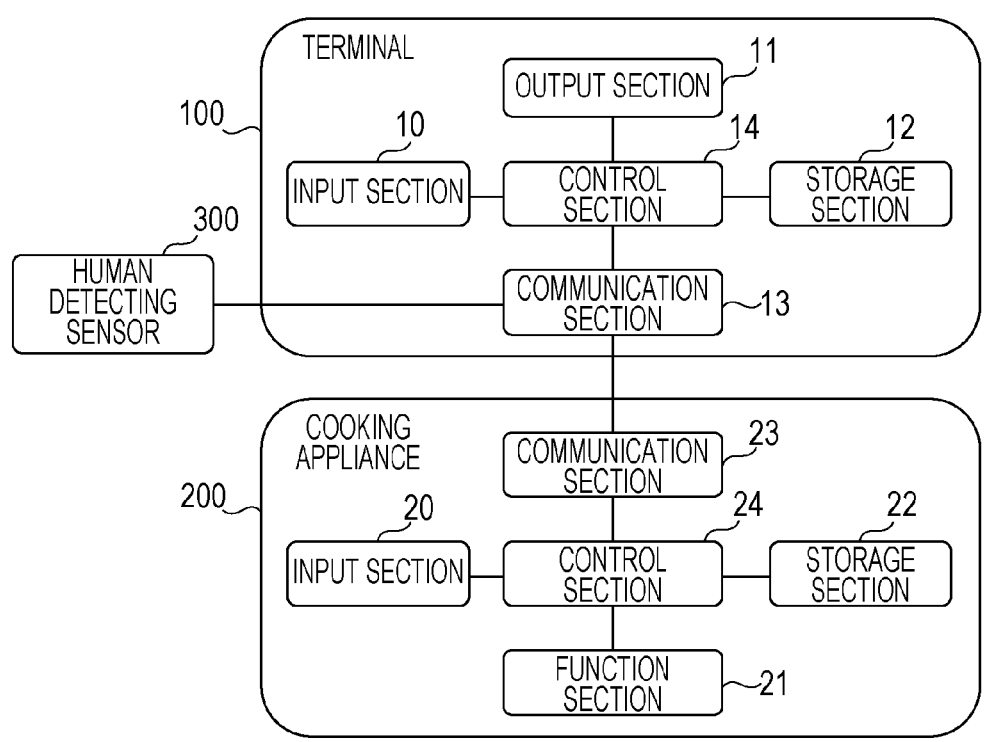
FIG. 1 is a block diagram illustrating an example of a configuration of a heating power control system according to an embodiment of the present disclosure.

Underlying Knowledge Forming Basis of Present Disclosure

Japanese Unexamined Patent Application Publication No. 2010-14372 proposes a technique for turning off the heat of a cooking appliance in a case where a user (a person who cooks) leaves a kitchen during cooking involving heating and does not return to the kitchen within a predetermined period of time. This makes it possible to prevent a fire occurring due to the absence of the user in the kitchen during cooking involving heating.

However, the heat is turned off irrespective of a heating method (a cooking method involving heating of ingredients, e.g., frying, stir-frying, or the like). In this respect, the technique of Japanese Unexamined Patent Application Publication No. 2010-14372 is inconvenient.

In view of this problem, the inventor of the present invention considered the following improvements.

(1) A heating power control device according to one aspect of the present disclosure includes: a storage in which control method information is stored, the control method information indicating a relationship between each of a plurality of heating methods of an ingredient and each of a plurality of corresponding control methods for reducing heating power of a cooking appliance; and a controller that (i) receives first information indicating an absence of a user of the cooking appliance from a kitchen is detected or a presence of the user in the kitchen is detected, (ii) determines whether or not the user is absent from the kitchen for a predetermined period of time during execution of one of the plurality of heating methods based on the received first information, (iii) reads out the control method information from the storage, in a case where it is determined that the user is absent from the kitchen for the predetermined period of time, (v) determines a first control method corresponding to the one of the plurality of the heating methods, and then (vi) causes the cooking appliance to execute the first control method.

(2) In the aspect, the predetermined period of time may be a period of time required for cooking using the one of the plurality of the heating methods.

(3) In the aspect, the controller may receive second information indicating that a presence of a person in the kitchen is detected; in a case where the second information is received within the predetermined period of time from a start of detection of the absence of the user from the kitchen, the controller may determine whether or not the person is the user; in a case where it is determined that the person is not the user, the controller may cause the cooking appliance to execute the first control method; and in a case where the person is the user, the controller may not cause the cooking appliance to execute the first control method.

(4) In the aspect, in a case where the first information indicating the presence of the user in the kitchen is detected is received after execution of the first control method, the controller may cause the cooking appliance to execute a second control method for changing the heating power to predetermined heating power set for the one of the plurality of the heating methods.

(5) In the aspect, the controller may receive second information indicating that a presence of a person in the kitchen is detected; in a case where the second information is received after execution of the first control method, the controller may determine whether or not the person is the user; in a case where it is determined that the person is not the user, the controller may cause the cooking appliance to keep executing the first control method; and in a case where it is determined that the person is the user, the controller may cause the cooking appliance to execute the second control method.

(6) In the aspect, the controller may receive temperature information indicating a temperature detected in the cooking appliance; in a case where the first information indicating the presence of the user in the kitchen is detected after execution of the first control method, the controller may determine whether or not a difference between a first temperature and a second temperature is less than a predetermined threshold value, the first temperature being indicated by the temperature information that is received when the first information indicating the absence of the user from the kitchen is detected is received and the second temperature being indicated by the temperature information when the presence of the user in the kitchen is detected is received; and in a case where the difference between the first temperature and the second temperature is not less than the predetermined threshold value, the controller may cause the cooking appliance to execute a third control method for changing the heating power to heating power higher than predetermined heating power set for the one of the plurality of the heating methods and then, when the controller determines a temperature indicated by the received temperature information reaches the first temperature, may cause the cooking appliance to change the heating power back to the predetermined heating power.

(7) In the aspect, the controller may receive second information indicating that a presence of a person in the kitchen is detected; the controller may determine whether or not the person is the user after execution of the first control method; in a case where it is determined that the person is not the user, the controller may cause the cooking appliance to execute the first control method; and in a case where it is determined that the person is the user, the controller may cause the cooking appliance to execute the third control method.

(8) In the aspect, the controller may receive power information indicating heating power of the cooking appliance; in a case where heating power indicated by the power information that is received at the start of the one of the plurality of heating methods does not match predetermined heating power set for the one of the plurality of heating methods, the controller may cause the cooking appliance to execute a fourth control method for changing the heating power to the predetermined heating power.

An embodiment of the present disclosure is described in detail below with reference to the drawings.

A configuration of a heating power control system according to the present embodiment is described below with reference to FIG. 1. FIG. 1 is a block diagram illustrating an example of the configuration of the heating power control system according to the present embodiment. As illustrated in FIG. 1, the heating power control system includes a terminal 100 (an example of a heating power control device of the present disclosure), a cooking appliance 200, and a human detecting sensor 300.

In FIG. 1, the terminal 100 and the cooking appliance 200 are connected to each other, for example, via a wireless network. The terminal 100 and the human detecting sensor 300 are connected to each other, for example, via a wireless network, a wired network, or a network combining a wireless network and a wired network. Note that a communication method used in the wireless network is, for example, a known near field radio communication method.

First, a configuration of the terminal 100 is described below.

The terminal 100 is, for example, an information processing device such as a smartphone or a tablet PC. The terminal 100 includes an input section 10, an output section 11, a storage section 12, a communication section 13, and a control section 14.

The input section 10 is an input device, such as a button or a touch panel, that accepts a user's operation.

The output section 11 is a display device such as a display or an audio output device such as a speaker.

For example, the output section 11 displays a cooking step image on a screen. The cooking step image is an image that corresponds to a cooking step of a recipe. The cooking step image is, for example, an image that shows a specific example of the cooking step by using characters, drawings, symbols, photographs, and the like. In the present embodiment, it is assumed that a predetermined recipe includes a plurality of cooking steps. Accordingly, a plurality of cooking step images corresponding to the respective cooking steps are prepared in advance. The order in which the cooking step images are displayed on the screen of the terminal 100 is determined in advance so as to correspond to the order of the cooking steps. A user cooks in accordance with the recipe while looking at the cooking step images displayed on the screen.

The storage section 12 is a storage device such as a memory or a hard disc.

For example, the storage section 12 stores therein information of the cooking step images (hereinafter referred to as cooking step image information).

Moreover, for example, the storage section 12 stores therein recipe information. The recipe information is information on the content of a recipe.

An example of the recipe information is described below with reference to FIG. 2. FIG. 2 is a diagram illustrating an example of the recipe information. In the example of FIG. 2, three cooking steps of a recipe whose recipe name is "curry" are illustrated. A cooking method, a required period of time, and heating power are determined as cooking conditions for each of the cooking steps.

The "cooking method" refers to a cooking method used in a cooking step. The "required period of time" refers to a period of time required for execution of a cooking step. The "heating power" refers to heating power that is set in a case where a cooking step is a heating step. In the example of FIG. 2, a first cooking step is a non-heating step, and second and third cooking steps are heating steps. Information on a cooking method, a required period of time, and heating power is hereinafter referred to as "cooking condition information". Note that the cooking condition information may include information such as information on names of used ingredients and the amounts of ingredients in addition to the information on a cooking method, a required period of time, and heating power.

An example of the recipe information has been described above.

Moreover, for example, the storage section 12 stores therein control method information. The control method information is information on a control method used in the cooking appliance 200.

An example of the control method information is described below with reference to FIG. 3. FIG. 3 is a diagram illustrating an example of the control method information. In the example of FIG. 3, a control method is determined for each heating method. The heating method is a cooking method involving heating of ingredients and is, for example, boiling, steaming, stir-frying, grilling, frying, or the like. The control method is a heating power control method executed in the cooking appliance 200. In the control method information of FIG. 3, a control method for turning down the heat to low heat is set in a case where the heating method is "boiling" or "steaming". Furthermore, a control method for turning down the heat to low heat and then turning off the heat after elapse of a predetermined period of time is set in a case where the heating method is "stir-frying" or "grilling". Furthermore, a control method for turning off the heat is set in a case where the heating method is "frying".

An example of the control method information has been described above.

Note that the cooking step image information, the recipe information, or the control method information may be acquired from a server device (not illustrated) or may be stored in advance in the terminal 100. The following describes the example of the configuration of the terminal 100 again.

The communication section 13 is a communication interface that communicates with another device.

For example, the communication section 13 receives detection information from the human detecting sensor 300. The detection information is information on a detection result of the human detecting sensor 300. The human detecting sensor 300 is, for example, a sensor, such as an infrared sensor or a pressure sensor included in a kitchen mat, that detects the presence or absence of a user in a kitchen. In the example of FIG. 1, the human detecting sensor 300 is provided outside the terminal 100. However, the human detecting sensor 300 may be provided inside the terminal 100.

In the present embodiment, the communication section 13 receives first detection information indicating the absence of a user in a kitchen or second detection information indicating the presence of a user in a kitchen.

Furthermore, for example, the communication section 13 transmits heating power control information (described later in detail) generated by the control section 14 to the cooking appliance 200.

The control section 14 is a control device such as a processor.

For example, the control section 14 reads out predetermined cooking step image information from the storage section 12 and controls the output section 11 to output a cooking step image on the basis of the cooking step image information. As a result of this control, a predetermined cooking step image is displayed on the screen by the output section 11.

Furthermore, for example, in a case where the control section 14 controls the output section 11 to output a predetermined cooking step image, the control section 14 reads out cooking condition information of a cooking step shown in the cooking step image (i.e., a cooking step that is being executed) from the storage section 12.

Furthermore, for example, in a case where the communication section 13 receives the first detection information, the control section 14 starts measurement of time.

Furthermore, for example, in a case where the communication section 13 receives the first detection information, the control section 14 determines whether or not a cooking step that is being executed is a heating step on the basis of the cooking condition information read out from the storage section 12 (hereinafter referred to as first determination). For example, in a case where information on a cooking step included in the cooking condition information is "boiling", "steaming", "stir-frying", "grilling", or "frying", the control section 14 determines that the cooking step that is being executed is a heating step.

Furthermore, for example, in a case where it is determined in the first determination that the cooking step that is being executed is a heating step, the control section 14 determines whether or not the communication section 13 has received the second detection information within a certain period of time from receipt of the first detection information (hereinafter referred to as second determination). The certain period of time is, for example, three seconds.

For example, in a case where it is determined in the second determination that the second detection information has not been received within the certain period of time, the control section 14 generates heating power control information. For example, the control section 14 reads out the control method information of FIG. 3 from the storage section 12 and then specifies a control method associated with the heating method that is being performed (boiling, steaming, stir-frying, grilling, or frying) in the control method information. Then, the control section 14 generates heating power control information instructing the cooking appliance 200 to execute the specified control method. Then, the control section 14 controls the communication section 13 to transmit the heating power control information to the cooking appliance 200. In this way, the heating power control information is transmitted to the cooking appliance 200.

Next, a configuration of the cooking appliance 200 is described below.

The cooking appliance 200 is, for example, an IH (Induction Heating) cooking appliance or a microwave. The cooking appliance 200 includes an input section 20, a function section 21, a storage section 22, a communication section 23, and a control section 24.

The input section 20 is an input device, such as a button or a touch panel, that accepts a user's operation.

For example, the input section 20 accepts an operation instructing the function section 21 that will be described later to execute functions thereof. For example, the input section 20 accepts a temperature setting operation for executing a heating function of the function section 21.

The function section 21 is a device that changes the state of a target (e.g., a cooking utensil such as a pot or a frying pan, or ingredients). The function section 21 is, for example, a heating device such as a heater.

For example, the function section 21 heats the cooking utensil under control of the control section 24 that will be described later.

The storage section 22 is a storage device such as a memory or a hard disc.

For example, the storage section 22 stores therein heating power control information received by the communication section 23 that will be described later.

The communication section 23 is a communication interface that communicates with another device.

For example, the communication section 23 receives heating power control information transmitted from the terminal 100.

The control section 24 is a control device such as a processor.

For example, in a case where the communication section 23 receives heating power control information, the control section 24 causes the heating power control information to be stored in the storage section 22. Then, the control section 24 reads out the heating power control information from the storage section 22 at a predetermined timing and controls the function section 21 on the basis of the heating power control information. For example, the control section 24 causes the function section 21 to execute a control method (any one of the control methods illustrated in FIG. 3) indicated by the heating power control information.

The configuration of the heating power control system according to the present embodiment has been described above.

Figure 4:
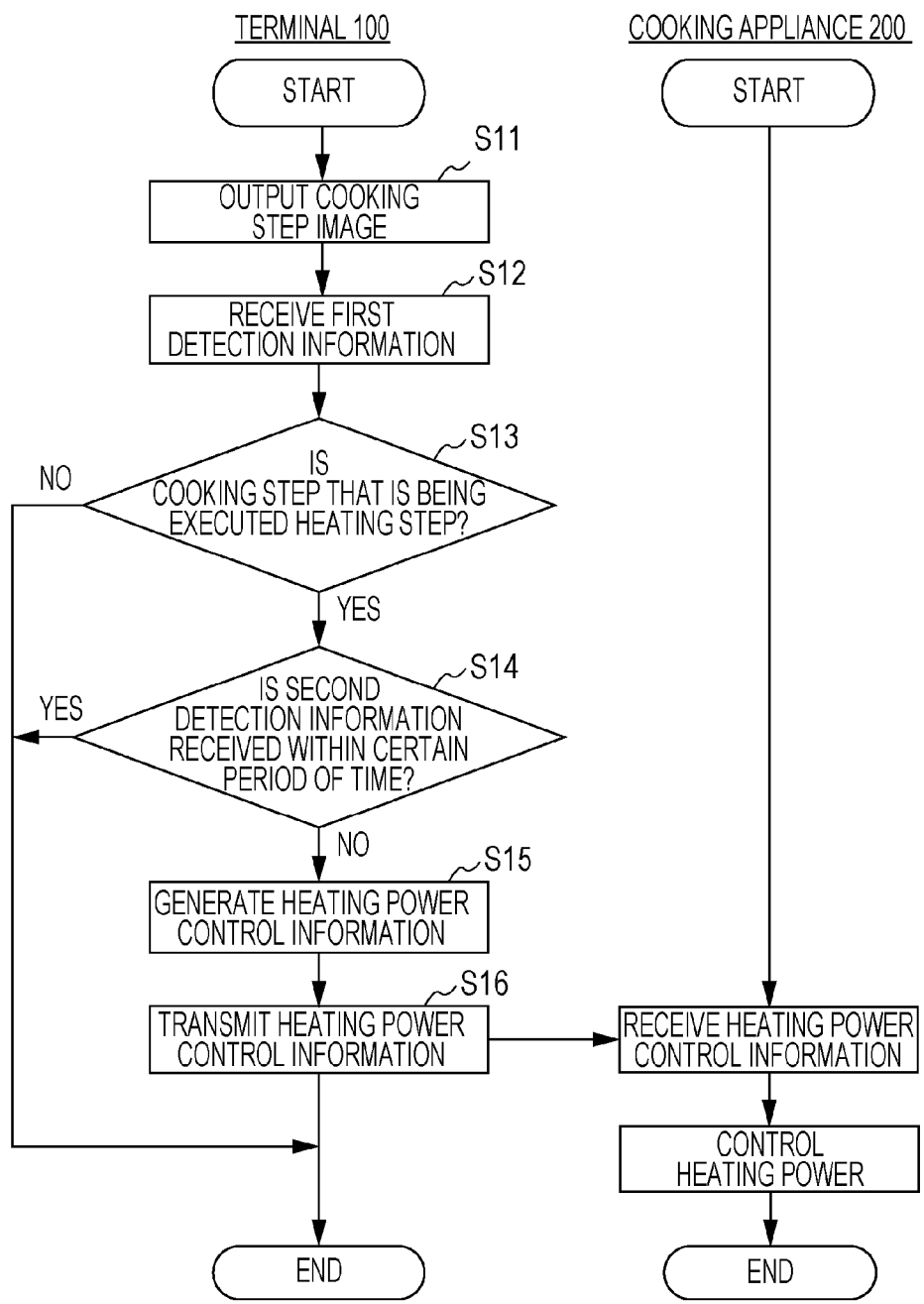
FIG. 4 is a sequence diagram illustrating an example of operation of the heating power control system according to the embodiment of the present disclosure.

Next, operation of the heating power control system according to the present embodiment is described below with reference to FIG. 4. FIG. 4 is a sequence diagram illustrating an example of operation of the heating power control system according to the present embodiment. The following describes, as an example, a case where a user executes the second cooking step illustrated in FIG. 2.

First, the control section 14 of the terminal 100 reads out cooking step image information that corresponds to the second cooking step from the storage section 12 and controls the output section 11 to output a cooking step image on the basis of the cooking step image information (Step S11). As a result of this control, the cooking step image showing a specific example of the second cooking step is displayed on the screen by the output section 11. The user executes the second cooking step by using the cooking appliance 200 while looking at this cooking step image displayed on the screen. Thus, heating on high heat is performed in the cooking appliance 200.

Furthermore, in Step S11, the control section 14 reads out cooking condition information of the second cooking step from the storage section 12. For example, information indicating the cooking method "stir-frying", required period of time "2 minutes", and heating power "high heat" in the recipe information of FIG. 2 is read out as the cooking condition information.

In a case where the user leaves a kitchen and the human detecting sensor 300 detects the absence of the user from the kitchen, the communication section 13 receives the first detection information from the human detecting sensor 300 (Step S12).

Next, in a case where the communication section 13 receives the first detection information, the control section 14 starts measurement of time and performs the first determination on the basis of the cooking condition information read out from the storage section 12. That is, the control section 14 determines whether or not the cooking step that is being executed is a heating step (Step S13).

In a case where it is determined in the first determination that the cooking step that is being executed is not a heating step (NO in Step S13), the flow ends. Meanwhile, in a case where it is determined in the first determination that the cooking step that is being executed is a heating step (YES in Step S13), the flow proceeds to Step S14. In this example, since the information on a cooking method included in the cooking condition information is "stir-frying", the control section 14 determines that the second cooking step that is being executed is a heating step (YES in Step S13). Therefore, the flow proceeds to Step S14.

Next, the control section 14 performs the second determination. That is, the control section 14 determines whether or not the communication section 13 has received the second detection information within a certain period of time (e.g., 5 seconds) from receipt of the first detection information (Step S14).

In a case where it is determined in the second determination that the communication section 13 has received the second detection information within the certain period of time (YES in Step S14), the flow ends. Meanwhile, in a case where it is determined in the second determination that the communication section 13 has not received the second detection information within the certain period of time (NO in Step S14), the flow proceeds to Step S15. In this example, it is assumed that the communication section 13 has not received the second detection information (NO in Step S14) because the user does not return to the kitchen within the certain period of time and accordingly the human detecting sensor 300 does not detect the presence of the user in the kitchen. Therefore, the flow proceeds to Step S15.

Next, the control section 14 generates heating power control information (Step S15). For example, the control section 14 reads out the control method information of FIG. 3 from the storage section 12 and then specifies, in the control method information, a control method "turning down the heat to low heat and then turning off the heat after elapse of a certain period of time" associated with the heating method "stir-frying" that is being executed. In this example, the certain period of time is, for example, 7 seconds. Next, the control section 14 generates heating power control information instructing the cooking appliance 200 to execute the specified control method. Then, the control section 14 controls the communication section 13 to transmit the heating power control information to the cooking appliance 200.

Next, the communication section 13 transmits the heating power control information to the cooking appliance 200 (Step S16).

Next, the communication section 23 of the cooking appliance 200 receives the heating power control information from the terminal 100 (Step S17).

Next, the control section 24 causes the heating power control information to be stored in the storage section 22. Then, the control section 24 reads out the heating power control information from the storage section 22 at a predetermined timing and controls heating power of the function section 21 on the basis of the heating power control information (Step S18). For example, the control section 14 changes the heating power of the function section 21 from high heat to low heat and then turns off the heat after elapse of a certain period of time (e.g., 7 seconds) from the change.

As described above, according to the present embodiment, it is possible to adjust heating power in accordance with a heating method that is being executed in a case where a user leaves a kitchen.

The embodiment of the present disclosure has been described above, but the present disclosure is not limited to the above embodiment. Modifications of the embodiment of the present disclosure are described below.

Modification 1

For example, the certain period of time used in the second determination may be a required period of time set as a cooking condition in the recipe information of FIG. 2. This specific example is described below.

For example, in Step S11 of FIG. 4, in a case where information on a cooking method (heating method) included in cooking condition information of a cooking step in execution that is read out from the storage section 12 indicates "boiling" or "steaming", the control section 14 sets a required period of time included in the cooking condition information as the certain period of time used in the second determination. For example, in a case where cooking condition information of the third cooking step is read out, a required period of time "15 minutes" is used in the second determination.

As described above, according to the present modification, in a case where a heating method, such as "boiling" or "steaming", that requires heating of a relatively long period of time is performed, it is possible to prevent interruption of cooking by not performing a predetermined control method (e.g., a control method for reducing the heat to "low heat" illustrated in FIG. 3) for a predetermined required period of time.

Modification 2

For example, in a case where heating power of a predetermined heating step that is being executed in the cooking appliance 200 is different from predetermined heating power, the heating power may be changed. This specific example is described below.

For example, when a user starts a predetermined heating step (for example, after a cooking step image is displayed in Step S11 of FIG. 4), the control section 24 of the cooking appliance 200 generates heating power state information indicating the state of heating power (e.g., high heat, medium heat, or low heat) of the function section 21 and then transmits the heating power state information to the terminal 100. When the communication section 13 receives the heating power state information, the control section 14 determines whether or not the heating power indicated by the heating power state information matches predetermined heating power indicated by information on heating power included in cooking condition information read out from the storage section 12. In a case where it is determined that the heating power indicated by the heating power state information does not match the predetermined heating power, the control section 14 generates heating power control information instructing the cooking appliance 200 to change the heating power to the predetermined heating power. Then, this heating power control information is transmitted from the terminal 100 to the cooking appliance 200. When the communication section 23 receives the heating power control information, the control section 24 of the cooking appliance 200 controls the heating power of the function section 21 on the basis of the heating power control information. Thus, the heating power of the function section 21 is changed to the predetermined heating power.

As described above, according to the present modification, even in a case where a user mistakenly sets the heating power in the cooking appliance 200, it is possible to change the heating power to appropriate heating power without a user's operation.

Modification 3

For example, in a case where a user who has been absent from a kitchen returns to the kitchen after transmission of heating power control information to the cooking appliance 200, the heating power may be changed back to original heating power. This specific example is described below.

For example, it is assumed that the communication section 13 receives the second detection information after receipt of the first detection information (Step S12 of FIG. 4) and transmission of heating power control information to the cooking appliance 200 (Step S16 of FIG. 4). In this case, the control section 14 generates heating power control information instructing the cooking appliance 200 to change the heating power to predetermined heating power indicated by information on heating power included in cooking condition information read out from the storage section 12. Then, this heating power control information is transmitted from the terminal 100 to the cooking appliance 200. When the communication section 23 receives the heating power control information, the control section 24 of the cooking appliance 200 controls the heating power of the function section 21 on the basis of the heating power control information. Thus, the heating power of the function section 21 is changed to the predetermined heating power.

As described above, according to the present modification, in a case where a user returns to a kitchen, it is possible to change the heating power to appropriate heating power without a user's operation.

Modification 4

For example, in a case where a user who has been absent from a kitchen returns to the kitchen after transmission of heating power control information to the cooking appliance 200, there are cases where the temperature of a cooking utensil such as a pot has decreased due to a control operation of turning down or turning off the heat that has been performed until the return of the user. In such cases, the heating power may be increased until the temperature returns back to a temperature detected when the user left the kitchen. This specific example is described below.

For example, in a case where the first detection information is received (Step S12 of FIG. 4), the communication section 13 of the terminal 100 transmits, to the cooking appliance 200, request information requesting transmission of temperature information indicating the temperature of a cooking utensil together with heating power control information.

Next, when the communication section 13 receives the heating power control information and the request information, the control section 24 of the cooking appliance 200 acquires temperature information (hereinafter referred to as first temperature information) on the temperature detected by a temperature sensor (not illustrated) and then controls the function section 21 on the basis of the heating power control information (e.g., information instructing the cooking appliance 200 to change the heating power from medium heat to low heat). Then, the communication section 23 transmits the first temperature information to the terminal 100.

Next, the control section 14 of the terminal 100 causes the first temperature information received by the communication section 13 to be stored in the storage section 12. Then, when the communication section 13 receives the second detection information, the communication section 13 transmits the request information to the cooking appliance 200 again. Upon receipt of the request information, the cooking appliance 200 transmits temperature information (hereinafter referred to as second temperature information) to the terminal 100 in a similar manner to that described above.

Next, the control section 14 of the terminal 100 causes the second temperature information received by the communication section 13 to be stored in the storage section 12. Then, the control section 14 reads out the first temperature information and the second temperature information from the storage section 12 at a predetermined timing and determines whether or not a difference between the temperature indicated by the second temperature information and the temperature indicated by the first temperature information is less than a predetermined threshold value.

In a case where it is determined that the difference between the temperature indicated by the second temperature information and the temperature indicated by the first temperature information is not less than the predetermined threshold value, the control section 14 generates heating power control information. For example, the control section 14 generates heating power control information instructing the control section 24 of the cooking appliance 200 to change the heating power to heating power (high heat) higher than predetermined heating power (e.g., medium heat) indicated by information on heating power included in cooking condition information read out from the storage section 12 and then, when the temperature indicated by the first temperature information is reached, change the heating power to the predetermined heating power (e.g., medium heat) indicated by the information on heating power. Then, this heating power control information is transmitted from the terminal 100 to the cooking appliance 200.

When the heating power control information is received by the communication section 23, the control section 24 of the cooking appliance 200 controls the heating power of the function section 21 on the basis of the heating power control information. Thus, the heating power of the function section 21 is changed from low heat to high heat and, when the temperature indicated by the first temperature information is detected by the temperature sensor, the heating power is changed to medium heat.

As described above, according to the present modification, in a case where a difference between the temperature of a cooking utensil detected when a user leaves a kitchen and the temperature of the cooking utensil detected when the user returns to the kitchen is not less than a predetermined threshold value, the temperature of the cooking utensil can be changed, in a short period of time, back to the temperature detected when the user left the kitchen. This allows the user to smoothly continue cooking.

Modification 5

For example, in a case where a predetermined control method is performed on the basis of heating power control information, the terminal 100 may output information (hereinafter referred to as notification information) indicating the contents of the control method. This specific example is described below.

For example, in a case where a control method for changing the heating power from medium heat to low heat is performed on the basis of heating power control information, the control section 14 of the terminal 100 controls the output section 11 to output, as notification information, at least one of an image and sound indicating the change from medium heat to low heat. The notification information may be output, for example, only at the time of transmission of the heating power control information to the cooking appliance 200 or during a period of time from transmission of the heating power control information to the cooking appliance 200 to reception of the second detection information.

In the above description, the terminal 100 outputs the notification information. However, the cooking appliance 200 may output the notification information. In this case, the control section 24 of the cooking appliance 200 controls an output section (not illustrated) of the cooking appliance 200 to output notification information received from the terminal 100.

As described above, according to the present modification, a user can recognize that the heating power has been changed when the user leaves a kitchen or returns to the kitchen.

Modification 6

In the above embodiment, a case where the terminal 100 specifies a heating method that is being executed in the cooking appliance 200 on the basis of recipe information (see, for example, FIG. 2) corresponding to a cooking step image that is being output has been described. However, the method for specifying a heating method that is being executed is not limited to this. For example, in a case where the cooking appliance 200 has a plurality of heating modes (operation modes corresponding to the types of heating methods, e.g., a mode for "boiling", a mode for "steaming"), the terminal 100 may receive information indicating a heating mode from the cooking appliance 200 when a heating method is started in the cooking appliance 200 and then specify the heating method that is being executed in the cooking appliance 200 on the basis of the heating mode indicated by this information.

Modification 7

In the above embodiment, the human detecting sensor 300 is used as a unit (hereinafter referred to as a user detecting unit) for detecting the presence or absence of a user in a kitchen. However, the user detecting unit is not limited to this. Other examples of the user detecting unit are described below.

For example, a camera that is capable of photographing the entire kitchen and an image processing device that recognizes the presence or absence of a user in the kitchen by performing image analysis of an image captured by the camera may be used. In this case, both of the camera and the image processing device may be provided outside the terminal 100 or may be provided inside the terminal 100. Alternatively, it is possible to employ an arrangement in which the camera is provided outside the terminal 100, and the image processing device is provided inside the terminal 100. Note that in a case where the image processing device is provided outside the terminal 100, the image processing device has a function of transmitting information on a result of image recognition (an example of detection information) to the terminal 100.

Alternatively, for example, a tag which a user carries and in which identification information of the user is stored and a reader that acquires the identification information from the tag via near-field radio communication may be used. An example of such a technique is an RFID (Radio Frequency IDentifier). The reader may be provided outside the terminal 100 or may be provided inside the terminal 100. Note that in a case where the reader is provided outside the terminal 100, the reader has a function of transmitting the identification information acquired from the tag to the terminal 100.

The control section 14 of the terminal 100 determines that a user is present in a kitchen while the communication section 13 is receiving the identification information from the reader provided outside the terminal 100 or while the reader provided inside the terminal 100 is acquiring the identification information. Then, the control section 14 performs processing similar to that performed when the second detection information is received in the above embodiment.

Meanwhile, the control section 14 determines that a user is absent from the kitchen while the communication section 13 is not receiving the identification information from the reader provided outside the terminal 100 or while the reader provided inside the terminal 100 is not acquiring the identification information. Then, the control section 14 performs processing similar to that performed when the first detection information is received in the above embodiment.

In the above example, an indoor positioning technology may be used. For example, the presence or absence of a user in a kitchen may be determined on the basis of (i) information on the position of the user measured based on the identification information acquired from the tag and (ii) information on the predetermined position (or region) of the kitchen. For example, this determination may be performed by the reader or may be performed by the control section 14 of the terminal 100.

Alternatively, for example, a cooking utensil including a human body communication module in which identification information of a user is stored and a transmitting device that is capable of performing near-field radio communication with the terminal 100 may be used. In this case, when the user touches the cooking utensil, the identification information is transmitted from the human body communication module to the transmitting device. Then, the transmitting device transmits the identification information received from the human body communication module to the terminal 100.

The control section 14 of the terminal 100 determines that the user is present in the kitchen while the communication section 13 is receiving the identification information from the transmitting device. Then, the control section 14 performs processing similar to that performed when the second detection information is received in the above embodiment.

Meanwhile, the control section 14 determines that the user has left the kitchen in a case where the communication section 13 ceases to receive the identification information from the transmitting device. Then, the control section 14 performs processing similar to that performed when the first detection information is received in the above embodiment.

Alternatively, for example, a microphone that collects sound occurring during cooking (e.g., sound of a kitchen knife, sound of running water) or voice of a user and a sound recognition device or a voice recognition device that recognizes the presence or absence of the user in a kitchen by performing sound recognition or voice recognition of the sound or voice collected by the microphone may be used. In this case, both of the camera and the sound or voice recognition device may be provided outside the terminal 100 or may be provided inside the terminal 100. Alternatively, it is possible to employ an arrangement in which the microphone is provided outside the terminal 100, and the sound or voice recognition device is provided inside the terminal 100. In a case where the sound or voice recognition device is provided outside the terminal 100, the sound or voice recognition device has a function of transmitting information on a result of sound or voice recognition (an example of detection information) to the terminal 100.

Other examples of the user detecting unit have been described above. Note that more accurate detection may be achieved by appropriately combining the aforementioned types of user detecting units and the human detecting sensor 300.

Modification 8

The control section 14 of the terminal 100 may determine whether or not a person who has returned to a kitchen is the same as a person who left the kitchen. In this case, the combination of a camera and an image processing device or the combination of a tag and a reader described in Modification 7 can be used. In the former case, it is determined that the two persons (the person who left the kitchen and the person who has returned to the kitchen) are the same in a case where a result of analysis (e.g., face recognition) of an image captured when the user left the kitchen is the same as a result of analysis of an image captured when the user returned to the kitchen. In the latter case, it is determined that the two persons are the same in a case where identification information acquired when the user left the kitchen is the same as identification information acquired when the user returned to the kitchen.

For example, in a case where the above determination is performed within a certain period of time from receipt of the first detection information (e.g., between Step S12 and Step S14 of FIG. 4), the control section 14 operates as follows. For example, in a case where it is determined that the two persons are the same, the control section 14 does not perform generation of heating power control information indicating a control method for reducing the heating power (e.g., Step S15 of FIG. 4). That is, in this case, the heating power at the time when the user left the kitchen is maintained. This is because it can be said that in a case where the person who has returned to the kitchen is the user himself or herself, the risk is small even if the heating power is maintained. Meanwhile, in a case where it is determined that the two persons are not the same, the control section 14 generates heating power control information indicating a control method for reducing the heating power (e.g., Step S15 of FIG. 4). That is, in this case, the heating power is reduced from the heating power at the time when the user left the kitchen.

For example, in a case where the above determination is performed after generation of heating power control information indicating a control method for reducing the heating power (e.g., Step S15 of FIG. 4), the control section 14 operates as follows. For example, in a case where it is determined that the two persons are the same, the control section 14 generates heating power control information indicating a control method for changing the heating power back to the original heating power (e.g., the control method described in Modifications 3 and 4). That is, in this case, the heating power that has been reduced by the control method for reducing the heating power returns to the predetermined heating power. This is because it can be said that in a case where the person who has returned to the kitchen is the user himself or herself, the risk is small even if the heating power is changed back to the original heating power. Meanwhile, for example, in a case where it is determined that the two persons are not the same, the control section 14 stops generation of the heating power control information indicating a control method for changing the heating power back to the original heating power (e.g., the control method described in Modifications 3 and 4). That is, in this case, execution of the control method for reducing the heating power is maintained.

As described above, according to the present modification, even in a case where a person other than a user enters a kitchen, it is possible to prevent a situation in which the control operation for reducing the heating power described in the above embodiment is not performed or a situation in which the control operation for changing the heating power back to the original heating power described in Modifications 3 and 4 is performed.

In the above description, it is determined whether or not a person who has returned to a kitchen is the same as a person who left the kitchen. Alternatively, it is possible to employ an arrangement in which it is determined whether or not a person who has entered the kitchen is a person registered in advance as a person who cooks. The person who cooks is a person (e.g., a husband or a wife) other than a user who left the kitchen and is a person who takes over cooking. Note that this determination can be achieved by using the combination of a camera and an image processing device or the combination of a tag and a reader, as in the above description.

For example, in a case where the above determination is performed within a certain period of time from receipt of the first detection information (e.g., between Step S12 and Step S14 of FIG. 4), the control section 14 operates as follows. For example, in a case where a person who has entered a kitchen is a person registered in advance as a person who cooks, the control section 14 does not perform generation of heating power control information indicating a control method for reducing the heating power (e.g., Step S15 of FIG. 4). Meanwhile, for example, in a case where the person who has entered the kitchen is not a person registered in advance as a person who cooks, the control section 14 generates heating power control information indicating a control method for reducing the heating power (e.g., Step S15 of FIG. 4).

For example, in a case where the above determination is performed after generation of heating power control information indicating a control method for reducing the heating power (e.g., Step S15 of FIG. 4), the control section 14 operates as follows. For example, in a case where a person who has entered a kitchen is a person registered in advance as a person who cooks, the control section 14 generates heating power control information indicating a control method for changing the heating power back to the original heating power (e.g., the control method described in Modifications 3 and 4). In this case, the heating power may be changed back to the original heating power after output of sound or an image indicating that the heating power is changed back to the original heating power. Alternatively, in order to achieve higher safety, it is possible to employ an arrangement in which sound or an image asking "Do you take over cooking?" is output, and the heating power is changed back to the original heating power in a case where an operation of approval of taking over cooking by the person who cooks is accepted. Meanwhile, for example, in a case where it is determined that the person who has entered the kitchen is not a person registered in advance as a person who cooks, the control section 14 stops generation of heating power control information indicating a control method for changing the heating power back to the original heating power (e.g., the control method described in Modifications 3 and 4).

In the above description, it is determined whether or not a person who has returned to a kitchen is the same as a person who left the kitchen. Alternatively, it is possible to employ an arrangement in which it is determined whether or not a person who has entered the kitchen is a child. For example, the control section 14 estimates the height of the person who has entered the kitchen on the basis of a result of detection using an infrared sensor or a result of image analysis using an image processing device and determines that the person is a child in a case where the estimated height is equal to or lower than a threshold value.

For example, in a case where it is determined that the person who has entered the kitchen is a child within a certain period of time from receipt of the first detection information (e.g., between Step S12 and Step S14 of FIG. 4) or after generation of heating power control information indicating a control method for reducing the heating power (e.g., Step S15 of FIG. 4), the control section 14 performs a control operation of outputting alarm sound and completely stopping heating.

Modification 9

In the above embodiment, a case where heating power control is achieved by communication between the terminal 100 and the cooking appliance 200 has been described. However, the functions of the storage section 12, the communication section 13, and the control section 14 of the terminal 100 may be realized by the storage section 22, the communication section 23, and the control section 24 of the cooking appliance 200. In this case, for example, the storage section 22 stores therein the recipe information of FIG. 2 and the control method information of FIG. 3. For example, the communication section 23 receives detection information from the human detecting sensor 300. For example, the control section 24 performs processing for outputting cooking step image (the cooking step image may be output to an output section (not illustrated) of the cooking appliance 200 or may be output to the output section 11 of the terminal 100), processing for generating heating power control information, or the like.

Modifications of the embodiment of the present disclosure have been described above. Note that the modifications may be combined in any way. Example in Which Functions are Realized by Computer Programs The embodiment and modifications of the present disclosure have been described in detail above with reference to the drawings. The functions of the terminal 100 and the cooking appliance 200 (hereinafter referred to as devices) can be realized by computer programs.

Figure 5:
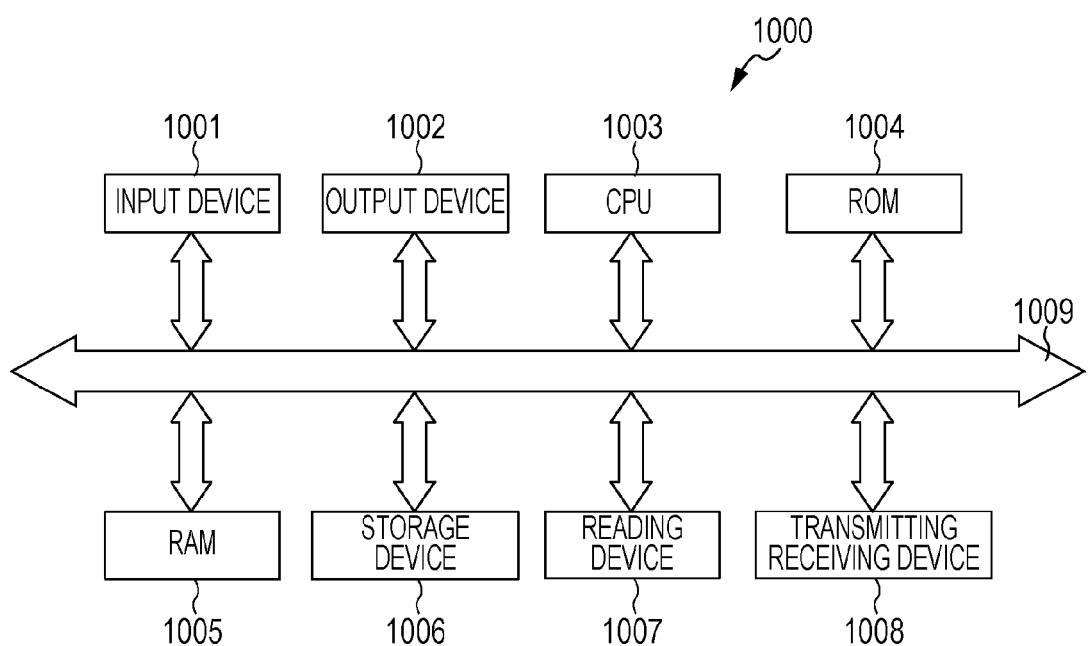
FIG. 5 is a diagram illustrating an example of a hardware configuration of a computer that realizes, by software, functions of each device of the heating power control system according to the embodiment of the present disclosure.

FIG. 5 is a diagram illustrating a hardware configuration of a computer which realizes the functions of each section by programs. This computer 1000 includes an input device 1001 such as an input button or a touch pad, an output device 1002 such as a display or a speaker, a CPU (Central Processing Unit) 1003, an ROM (Read Only Memory) 1004, and an RAM (Random Access Memory) 1005. Furthermore, the computer 1000 includes a storage device 1006 such as a hard disc device or an SSD (Solid State Drive), a reading device 1007 that reads information from a recording medium such as a DVD-ROM (Digital Versatile Disk Read Only Memory) or a USB (Universal Serial Bus) memory, and a transmitting receiving device 1008 that performs communication via a network. These members are connected via a bus 1009.

The reading device 1007 reads programs for realizing the functions of each section from a recording medium in which the programs are stored and then causes the programs to be stored in the storage device 1006. Alternatively, the transmitting receiving device 1008 downloads the programs for realizing the functions of each section from a server device connected to the network by communicating with the server device and causes the programs to be stored in the storage device 1006.

Then, the CPU 1003 copies the programs stored in the storage device 1006 to the RAM 1005 and then sequentially reads out commands included in the programs from the RAM 1005 and execute the commands. In this way, the functions of each section are realized. Moreover, when the programs are executed, information obtained in the various kinds of processing described in the embodiment is stored in the RAM 1005 or the storage device 1006 and is appropriately used.

The present disclosure is suitably applicable to a heating power control device and a heating power control method for controlling heating power of a cooking appliance, and a recording medium storing a computer program for controlling heating power of a cooking appliance.

What is claimed is:

1. A heating power control system comprising:
a cooking appliance,
a terminal device configured to communicate to the cooking device and a server device via wired or wireless network, and
a sensor that detects first detection information indicating an absence or a presence of a user in a kitchen where the cooking appliance is provided,
wherein the terminal device including:
a storage in which cooking information is stored, the cooking information including a cooking process that is executed using the cooking appliance, the cooking process being obtained from the server device via wired or wireless network,
a receiver that receives the first detection information from the sensor via wired or wireless network, and
a controller that (i) determines whether or not the user is absent from the kitchen for a predetermined period of time based on the first detection information, (ii) determines, based on the cooking information, a control method of controlling heating power of the cooking appliance, when the user is determined to be absent from the kitchen for the predetermined period of time based on the first detection information, and when the cooking process is determined to be a heating process, and (iii) controls, via the wired or wireless network, the heating power of the cooking appliance by the determined control method.

2. The heating power control system according to claim 1, wherein
the control method is determined by referring to a table associating the cooking process and the control method.

3. The heating power control system according to claim 1, wherein
the cooking process includes at least one of boiling, steaming, stir-frying, grilling and frying.

4. The heating power control system according to claim 3, wherein
turning down heat to low heat is determined as the control method when the first information indicates that the cooking process is boiling or steaming.

5. The heating power control system according to claim 3, wherein
turning down heat to low heat and then turning off heat after elapse of a predetermined of time is determined as the control method when the first information indicates that the cooking process is stir-frying or grilling.

6. The heating power control system according to claim 3, wherein
turning off heat is determined as the control method when the first information indicates that the cooking process is frying.

7. The heating power control system according to claim 1, wherein the predetermined period of time is a period of time required for cooking using one of a plurality of heating methods.

8. The heating power control system according to claim 1, wherein
the controller receives third information indicating a presence of a person; when the third information is received within the predetermined period of time from a start of detection of the absence of the user, the controller determines whether or not the person is the user;
in response to determining that the person is not the user, the controller causes the cooking appliance to execute the determined control method; and
in response to determining that the person is the user, the controller does not cause the cooking appliance to execute the determined control method.

9. The heating power control system according to claim 1, wherein
when the second information indicating the presence of the user is received after the determined control method is commenced, the controller causes the cooking appliance to execute a different control method that changes the heating power of the determined control method to one of a plurality of heating powers stored in the storage.

10. The heating power control system according to claim 9, wherein
the controller receives third information indicating a presence of a person;
when the third information is received after the determined control method is commenced, the controller determines whether or not the person is the user;
in response to determining that the person is not the user, the controller causes the cooking appliance to keep executing the determined control method; and
in response to determining that the person is the user, the controller causes the cooking appliance to execute the different control method.

11. The heating power control system according to claim 1, wherein
the controller receives temperature information indicating a temperature detected in the cooking appliance;
when the second information, indicating the presence of the user, is received after the determined control method is commenced, the controller determines whether or not a difference between a first temperature and a second temperature is smaller than a threshold value, the first temperature being indicated by the temperature information that is received when the second information, indicating the absence of the user, is received and the second temperature being indicated by the temperature information when the second information, indicating the presence of the user, is received; and
when the difference between the first temperature and the second temperature is not smaller than the threshold value, the controller causes the cooking appliance to execute a different control method that changes the heating power to a heating power higher than a predetermined heating power set for one of a plurality of heating methods, and after the execution of different control method, when the controller determines a temperature indicated by the received temperature information reaches the first temperature, causes the cooking appliance to return the heating power to the predetermined heating power.

12. The heating power control system according to claim 11, wherein
the controller receives third information indicating a presence of a person;
the controller determines whether or not the person is the user after the determined control method is commenced;
in response to determining that the person is not the user, the controller causes the cooking appliance to keep executing the determined control method; and
in response to determining that the person is the user, the controller allows the cooking appliance to execute the different control method.

13. The heating power control system according to claim 1, wherein
the controller receives power information indicating heating power of the cooking appliance;
when the heating power indicated by the power information that is received at a start of one of a plurality of heating methods does not match a predetermined heating power set for one of the plurality of heating methods, the controller causes the cooking appliance to execute a different control method that changes the heating power to the predetermined heating power.

14. A non-transitory computer-readable recording medium storing a program for causing a computer to execute operations of:
acquiring, from a server device via wired or wireless network, a cooking process to be executed using a cooking appliance;
causing the cooking appliance to execute cooking in accordance with the cooking process,
receiving detection information indicating an absence or a presence of a user of the cooking appliance,
determining, based on the detection information, the absence of the user for a predetermined period of time,
determining, based on the cooking process, a control method of controlling heating power of the cooking appliance, in a case where (i) the user is determined to be absent for the predetermined period of time and (ii) the cooking process is determined to be a heating process, and
controlling, via the wired or wireless network, the heating power of the cooking appliance based on the determined control method.

15. A non-transitory computer-readable recording medium storing a program for causing a computer to execute operations of:
reading, from a storage, cooking process information corresponding to a cooking process to be executed using a cooking appliance, the cooking process being obtained from a server device via wired or wireless network,
displaying, on a display, an image of the cooking process based on the cooking process information,
reading, from the storage, cooking condition information of the cooking process,
receiving, from a detection sensor via wired or wireless network, first detection information indicating an absence or presence of the user of the cooking appliance,
in a case where (i) the user is determined to be absent based on the first detection information, and (ii) the cooking process being executed with the cooking appliance is determined to be a heating process, determining whether or not second detection information indicating the presence of the user of the cooking appliance is received, from the detection sensor via wired or wireless network, within a predetermined period of time from when a start of detection of the absence of the user;
reading control method information in response to determining that the second detection information indicating the presence of the user of the cooking appliance is not received within the predetermined period of time,
determining, in the control method information, a control method associated with a heating process of the cooking process being executed using the cooking appliance,
transmitting heating control information which includes an instruction to execute the determined control method to the cooking appliance, and controlling heating power of the cooking appliance in accordance with the heating control information.

16. The non-transitory computer-readable recording medium according to claim 15, wherein the program further causes the computer to execute an operation of transmitting instruction information that instructs the cooking appliance to execute the cooking process, the instruction information being received when the image of the cooking process is displayed on the display.

17. A non-transitory computer-readable recording medium storing a program for causing a computer to execute operations of:
acquiring, from a server device via wired or wireless network, heating control information that instructs a cooking appliance to execute a control method which controls heating power of the cooking appliance,
storing the heating control information acquired from the server device in a storage,
reading the heating control information from the storage, and
controlling the heating power of the cooking appliance in accordance with the heating control information,
wherein the heating control information is generated based on a first determination that a user of the cooking appliance is absent, for a predetermined period of time, based on detection information received from a detection sensor via wired or wireless network, and a second determination that a cooking process being executed using the cooking appliance is a heating process.

* * * * *